United States Patent
Fang et al.

(10) Patent No.: US 8,443,953 B2
(45) Date of Patent: May 21, 2013

(54) CLUTCH WITH HIGH BINDING ABILITY

(76) Inventors: Jui-Ming Fang, Taoyuan County (TW);
Norman Lien, Taoyuan County (TW)

(*) Notice: Subject to any disclaimer, the term of this patent is extended or adjusted under 35 U.S.C. 154(b) by 377 days.

(21) Appl. No.: 12/801,519

(22) Filed: Jun. 14, 2010

(65) Prior Publication Data
US 2011/0240433 A1    Oct. 6, 2011

(30) Foreign Application Priority Data
Apr. 6, 2010    (TW) ................................ 99110534 A

(51) Int. Cl.
*F16D 43/18*    (2006.01)
*F16D 43/22*    (2006.01)

(52) U.S. Cl.
USPC ..... 192/75; 192/52.5; 192/54.5; 192/105 CD; 192/105 CE

(58) Field of Classification Search
USPC ............... 192/105 CD, 105 CE, 52.5
See application file for complete search history.

(56) References Cited

U.S. PATENT DOCUMENTS

| | | | | |
|---|---|---|---|---|
| 2,275,046 | A * | 3/1942 | Harris .................... | 192/105 CD |
| 3,971,462 | A * | 7/1976 | Johansson ............... | 192/105 CE |
| 4,157,136 | A * | 6/1979 | Salle ............................ | 192/52.5 |
| 4,311,331 | A * | 1/1982 | Lutz ......................... | 192/105 CE |
| 6,918,480 | B2 * | 7/2005 | Chevalier ................ | 192/105 CE |
| 2008/0053783 | A1 * | 3/2008 | Lean et al. ............. | 192/105 CD |

* cited by examiner

*Primary Examiner* — Rodney Bonck
(74) *Attorney, Agent, or Firm* — Leong C. Lei

(57) ABSTRACT

A clutch with high binding ability comprises a plurality of detent components provided between a left and a right lateral plates and each detent component can be pulled back to its original location by a resilient element. The detent block of each detent component is movably positioned between the left and the right lateral plates. The detent element of each detent component is slidably connected onto the detent block. One end of the detent element is provided with a groove for locating a positioning bar therein. Thereby, when the clutch rotates, the radial force of the detent element can be increased in order to enhance the detent ability of the detent element. When the rotational speed of the clutch is decreased to be the rotational speed of passive driving or to be lower than the rotational speed for engagement, the detent element can be pulled back to its original location by means of the elastic element located between the detent block and the detent element.

13 Claims, 4 Drawing Sheets

CLUTCH WITH HIGH BINDING ABILITY

TECHNICAL FIELD

The present invention relates to a clutch and, more particularly, to a clutch with high binding ability, which is able to enhance the detent ability and suitable for motorcycles, all-terrain vehicles (ATV), or other apparatuses in need of the joint of power transmission.

BACKGROUND

Recently, most motorcycles are possessed of automatic transmission function. As regard to the automatic transmission mechanism of motorcycles, centrifugal clutches are mainly used as elements for power transmission. When the engine of a motorcycle is driven and the rotational speed of the engine is gradually increasing, the clutch rotates via the pulley driving and the detent block of the clutch is thrown outwards. The lining on the external surface of the detent block will be in touch with the internal surface of the frame of a driven disc, and consequently power is transmitted to a driven axis to drive vehicle wheels. When the rotational speed of the engine decreases, the power transmission is stopped as a result that the detent block is pulled inward by the extension spring.

During the time when the detent block is moved, its movement is unstable and will lead to unstable power transmission because of the material characteristics of the detent block. Moreover, the radial force that moves outwards the detent block of the conventional clutch is weaker, which will result in the insufficient strength of the engagement between the detent block and the internal surface of the frame of the driven disc. Consequently, it takes more time and requires higher rotational speed of the engine to rotate the driven disc synchronously. Besides, it takes more time to establish the connection between the lining and the frame of the driven disc. In other words, the lining will rub against the frame of the driven disc for a longer time, which will scorch and degenerate the lining and speed up its abrasion.

Please refer to FIG. 6 showing an improved clutch designed for overcoming above shortcomings. The improved clutch comprises a base having a driving disc "a" and a linked disc "b". Relative to the internal surface of each indent detent block "c", the driving disc "a" is provided with a plurality of limiting parts "d" in shape of axial pin passing through the curved slotted holes provided on the linked disc "b". Besides, the driving disc "a" is provided on the body thereof with a plurality of slots "e". The linked disc "b" is provided on the body thereof with slot openings "f" corresponding to the slots "e". Moreover, an elastic piece "g" is provided in the corresponding slot "e" of the deriving disc "a" and the slot opening "f" of the linked disc "b". Consequently, the linked disc "b" can be driven by the driving disc "a". Furthermore, the linked disc "b" is pivotally connected with each detent block "c". Each detent block "c" has a V-shape slot "h" on the internal surface thereof and one axial-pin-shape limiting part "d" is located in the V-shape slot "h". Thereby, when the base is in accelerated rotation and the linked disc "b" bears so strong rotational resistance that the deformation strength of the elastic piece "g" is insufficient, the elastic piece "g" will be deformed. As a result, the driving disc "a" and the linked disc "b" will move in opposite directions and the axial-pin-shape limiting part "d" will move along the oblique surface "i" in the V-shape slot "h". Accordingly, the lining "j" can be firmly attached to the internal surface of the frame "k" of the driven disc.

By this way, not only can the power transmission be rendered more smooth and stable, but also less time is taken for the lining to rub against the frame of the driven disc. Consequently, the abrasion of the lining can be reduced and lifetime lengthened as well. However, this kind of clutch as a whole has a quite complicated structure, which will increase the manufacturing and assembling cost and will make the maintenance difficult.

In order to overcome above shortcomings and provide a clutch having a unique structure different from conventional ones, inventor had the motive to study and develop the present invention. After hard research and development, the inventor provides a clutch with high binding ability, which has simple structure and lower manufacturing cost and maintenance expense.

SUMMARY OF THE DISCLOSURE

An object of the present invention is to provide a clutch with high binding ability, where the outward radial force of the lining is increased so as to rotate the driven disc at a relatively low rotational speed to drive vehicle wheels. Thereby, the problems of the insufficient detent force and the unstable movement of conventional detent blocks can be overcome, so that the rubbing time of the lining is shortened and the temperature rise is moderated, which further lengthens the lifetime of the lining.

Another object of the present invention is to provide a clutch with high binding ability, which has simple structure and lower manufacturing cost and maintenance expense.

In order to achieve above objects, the present invention provides a clutch with high binding ability comprising a left lateral plate, a right lateral plate, and a plurality of detent components positioned between the left and the right lateral plates. Each detent component is connected with a resilient element for pulling the detent component back to its original location. It is characterized in that: a plurality of positioning bars is provided between the left and the right lateral plates; each detent component has a detent block, a detent element, and an elastic element, where the detent block is movably positioned between the left and the right lateral plates; the detent element is slidably connected to the detent block; one end of the detent element is provided with a groove for locating one positioning bar therein; and the elastic element is provided between the detent block and the detent element.

Thereby, when the clutch is driven to rotate, the detent block will be thrown outwards. At the same time, the detent element will slide in a direction opposite to that of the clutch and move radially relative to the positioning bar so as to increase the detent ability of the detent element. Moreover, when the rotational speed of the clutch is decreased to be equal to that of passive driving or to be lower than the rotational speed for engagement, the detent element can be pulled back to its original location by the elastic element.

In practice, the detent block is provided with a space; the detent element includes a base and a lining connected to the base and is slidably connected into the space of the detent block.

In practice, at least a guide track is provided in the space of the detent block while the base is provided with at least a guide slot thereon corresponding to the guide track.

In practice, the grooves of the detent elements are in V-shape at an angle.

In practice, the grooves of the detent elements are in V-shape at different angles so as to adjust the radial force of each lining when each detent block is thrown outward.

Thereby, binding ability between the lining and the driven disc is gradually increased so as to make the rotation more stable.

The following detailed description, given by way of examples or embodiments, will best be understood in conjunction with the accompanying drawings.

DETAILED DESCRIPTION

Figure 1:
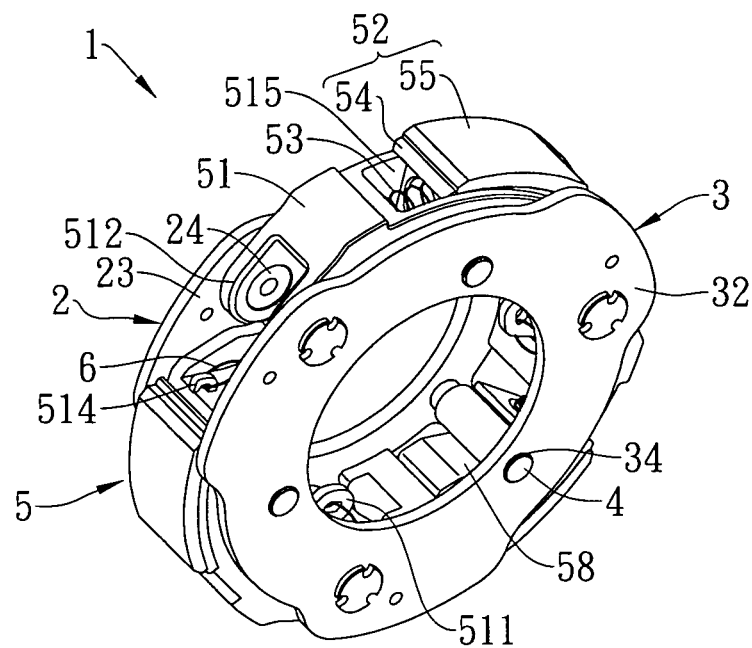
FIG. 1 is a perspective view of a preferable embodiment of the present invention.
Figure 2:
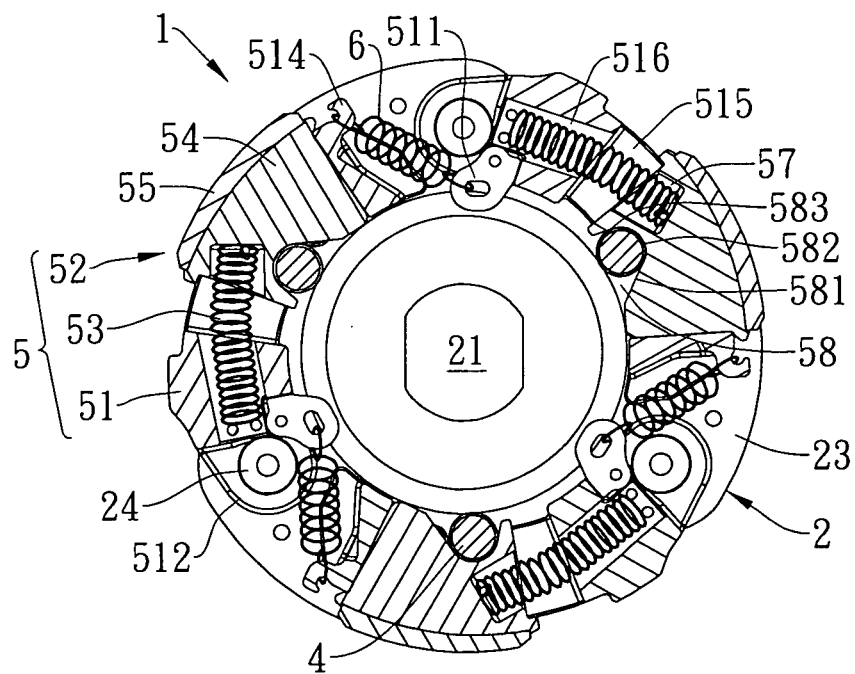
FIG. 2 is a cross-sectional view of the preferable embodiment of the present invention.
Figure 3:
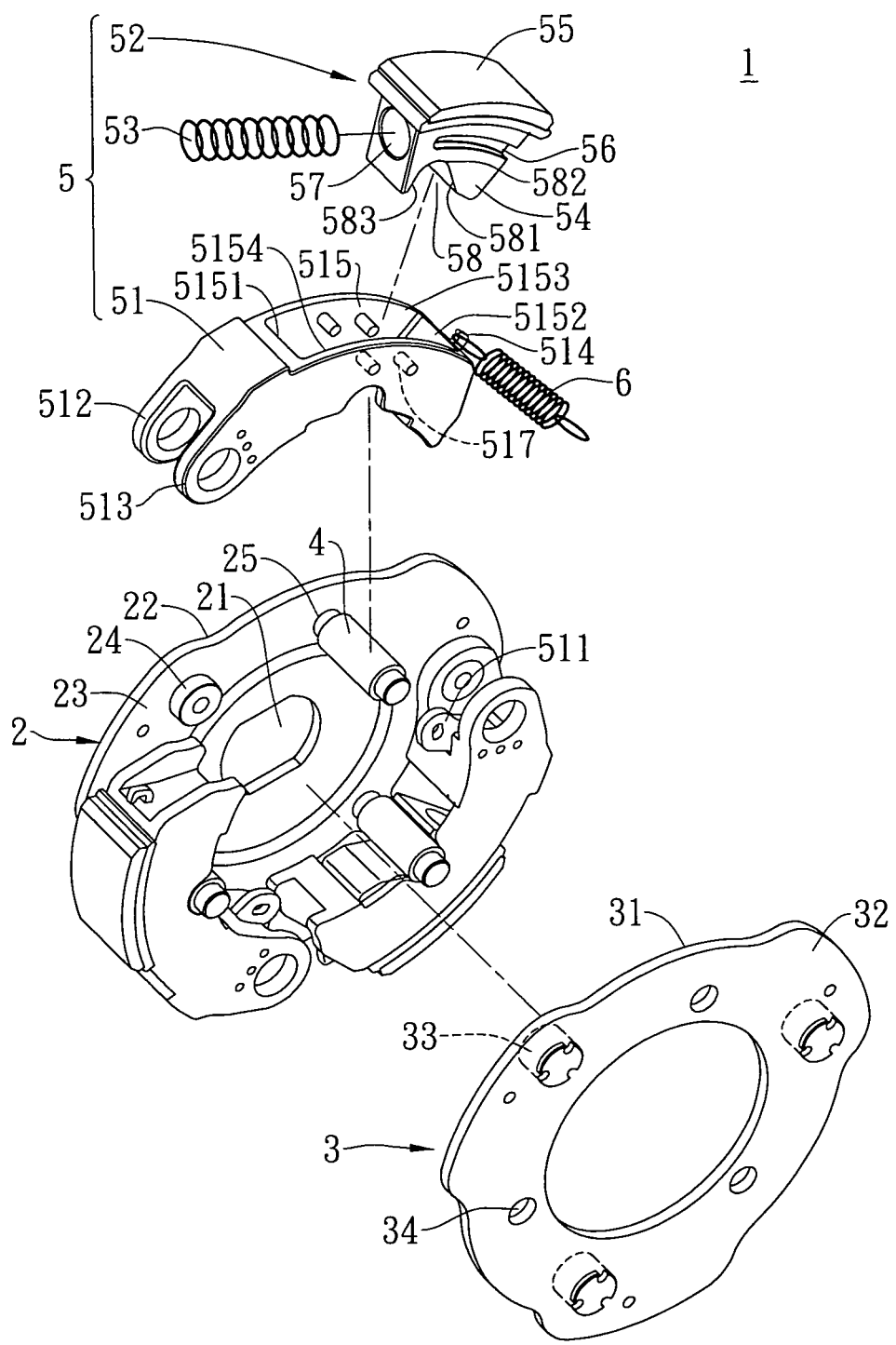
FIG. 3 is an exploded perspective view of the preferable embodiment of the present invention.
Figure 4:
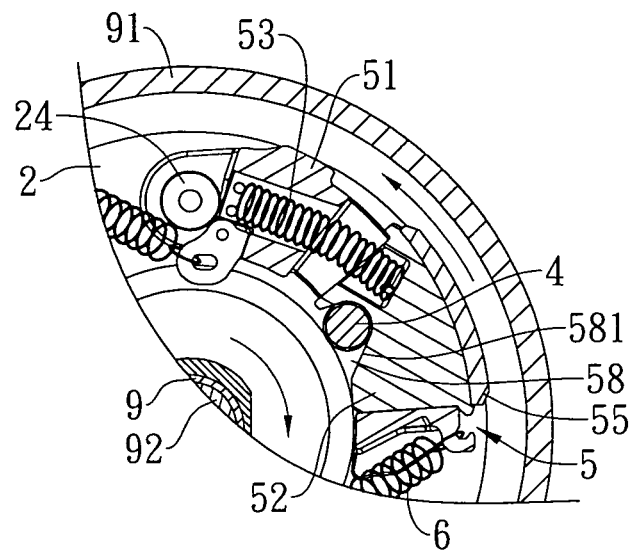
FIGS. 4 and 5 are schematic views showing the use of the preferable embodiment of the present invention.

Please refer to FIGS. 1 to 3 showing a preferable embodiment of a clutch with high binding ability 1 according to the present invention. The clutch is positioned to the internal surface of the frame 91 of a driven disc 9 in an automatic transmission mechanism for motorcycles and is used for transmitting power to a driven axis 92 (as shown in FIG. 4) in order to drive the wheels. The automatic transmission mechanism is a conventional one and nothing will be given in details here. In practice, the present invention is also suitable for all-terrain vehicles (ATV) or other apparatuses in need of the joint of power transmission in addition to motorcycles. In this embodiment, the clutch with high binding ability 1 comprises a left lateral plate 2, a right lateral plate 3, a plurality of positioning bars 4, a plurality of detent components 5, and a plurality of resilient elements 6.

The left lateral plate 2 is made by processing a flat plate having an axial hole 21 and is connected with a belt pulley, so that it will rotate with the driving of the belt pulley. The left lateral plate 2 has a left side surface 22 and a right side surface 23, where on the right side surface 23 is provided with plural left pivots 24 and plural left positioning holes 25.

The right lateral plate 3 is a flat plate substantially symmetrical to the flat plate of the left lateral plate 2. The right lateral plate 3 has a left side surface 31 and a right side surface 32, where on the left side surface 31 is provided with plural right pivots 33 and plural right positioning holes 34 respectively corresponding to the left pivots 24 and left positioning holes 25.

Each of the positioning bars 4 is an elongated and round bar. The left end of each positioning bar 4 is inserted through one left positioning hole 25 of the left lateral plate 2 and is positioned within the left positioning hole 25. The right end of each positioning bar 4 is inserted through one right positioning hole 34 of the right lateral plate 3 corresponding to the left positioning hole 25 and is positioned within the right positioning hole 34. Thereby, the positioning bars 4 are connected between the left and right lateral plates 2, 3 and are parallel to each other.

Each detent component 5 has a detent block 51, a detent element 52, and an elastic element 53. One end of the detent block 51 is provided with a circular hook 511 and a pair of left and right protruding ears 512, 513 that are symmetrical to each other. The left and right protruding ears 512, 513 are respectively in pivotal connection with the left pivot 24 of the left lateral plate 2 and the right pivot 33 of the right lateral plate 3 so as to have the detent block 51 pivotally connected and movable between the left and the right lateral plates 2, 3. Another end of the detent block 51 is provided with a hook portion 514. One end of the resilient element 6 is connected with the hook portion 514 of one detent block 51 while another end of the resilient element 6 is connected with the circular hook 511 of another adjacent detent block 51. By this way, the detent blocks 5 can be limited at predetermined positions. In practice, the components for pivotal connection also can be not used. In this case, the detent blocks 51 are positioned between the left and the right lateral plates 2, 3 in a radially movable way.

Moreover, each detent block 51 is provided with an open receiving space 515 and a first positioning slot 516 that is in communication with the receiving space 515. The receiving space 515 is defined by a front side surface 5151, a rear side surface 5152, a left internal wall 5153, and a right internal wall 5154. A pair of protruding pillars protruding rightward from the left internal wall 5153 while another pair of protruding pillars protruding leftward from the right internal wall 5154. These two pairs of protruding pillars form two guide tracks 517.

The detent element 52 is located in the receiving space 515 of the detent block 51. The detent element 52 has a base 54 approximately in fan shape and a curved lining 55 connected to the base 54. The left and right sides of the base 54 are respectively provided with a guide slot 56. The two guide slots 56 are respectively provided correspondingly to the two guide tracks 517 in the receiving space 515. Consequently, the detent element 52 is connected to the detent block 51 in a slidable way. Moreover, the base 54 is provided with a second positioning slot 57 on the front side surface thereof. The second positioning slot 57 and the first positioning slot 516 of the detent block 51 are respectively used to locate and position two ends of a compression spring. By the elastic force provided by the compression spring, the detent element 52 can be pushed toward the rear side surface 5152 of the detent block 51 and be positioned. The compression spring is used as the elastic element 53. In practice, the elastic element 53 also can be an extension spring. The extension spring is positioned between the rear side surface 5152 of the detent block 51 and the detent element 52. By this way, the detent element 2 also can be pulled toward the rear side surface 5152 of the detent block 51.

Moreover, the bottom of each detent element 52 is provided with a V-shape groove 58 and these grooves 58 are in V-shape at the same angle. Each V-shape groove 58 is defined by a front oblique surface 581, a curved surface 582, and a rear oblique surface 583. When the detent element 52 is located in the receiving space 515 of the detent block 51, the curved surface 582 is against the peripheries of the positioning bar 4.

Figure 5:
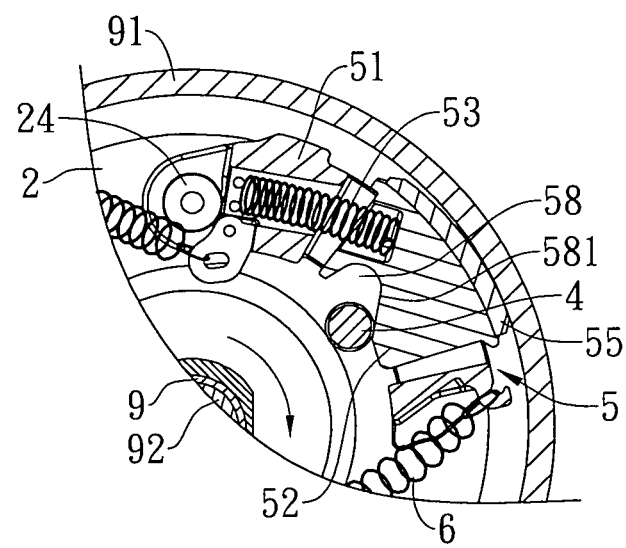
Figure 6:
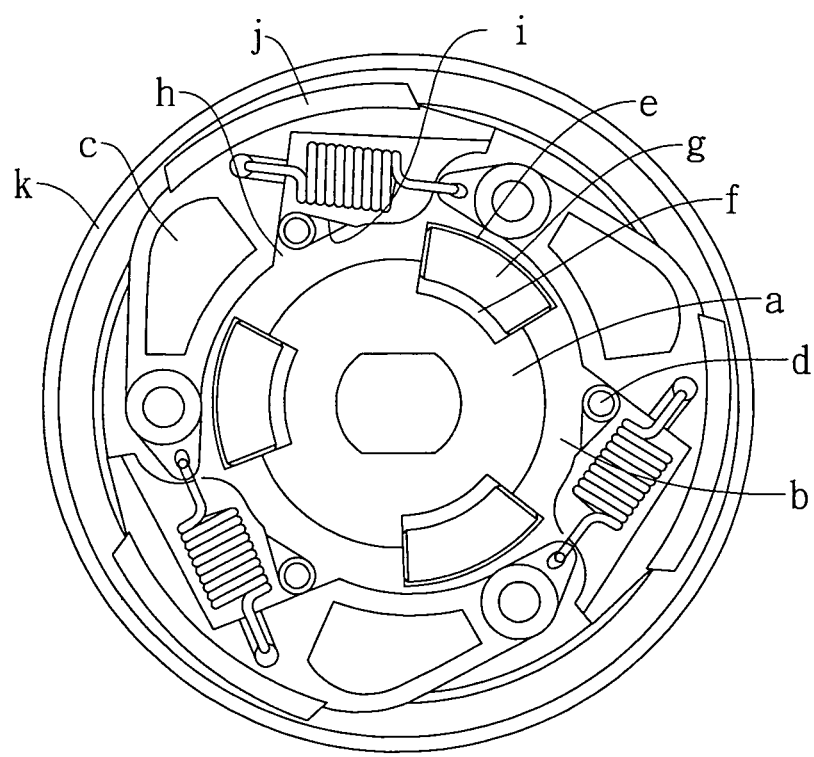
FIG. 6 is a cross-sectional view of a conventional clutch.

Thereby, as shown in FIGS. 4 and 5, when the belt pulley drives the left lateral plate 2 to rotate clockwise, the detent block 51 of each detent component 5 will be thrown outward around an axis center including the left and the right pivots 24, 33 of the left and right lateral plates 2, 3. Under this condition; the detent element 52 moves counterclockwise relative to the detent block 51. The detent element 52 moves radially relative to the positioning bar 4 and compresses the elastic element 53. The front oblique surface 581 of the V-shape groove 58 of the detent element 52 slides on the positioning bar 4 so as to enhance the binding ability between the lining 55 of the detent element 52 and the frame 91 of the driven disc 9. Thus, rubbing time of the lining 55 is shortened. When the rotational speed of the left lateral plate 2 is lower than that of the driven disc 9 (becoming passive driving) or is lower than the rotational speed for engagement between the lining 55 and the driven disc 9, the detent element 52 and the detent block 51 can be pulled back to their original locations via the elastic force provided by the elastic element 5 and the resilient element 6.

In practice, the grooves 58 can be in V-shape at different angles so as to enhance gradually the binding ability between the lining 55 and the driven disc 9 and to adjust the engagement ability between each detent element 52 and the frame 91 of the driven disc 9.

Therefore, the present invention has following advantages:
1. According to the present invention, the outward radial force of the lining can be increased so as to solve the conventional problem concerning insufficient lining engagement force. Consequently, the rubbing time of the lining is shortened and the temperature rise is also moderated, which ultimately lengthens the lifetime of the lining.
2. According to the present invention, the detent element is able to slide relative to the detent block when the clutch rotates. Thereby, it is effective to solve the conventional problem of unstable movement of the detent block and it will make power transmission smoother.
3. The present invention has simple structure, which facilitates the replacement of detent elements. Thereby, it is not only able to decrease effectively the manufacturing cost, but also convenient for follow-up maintenance.

As disclosed in above descriptions and attached drawings, the present invention provides a clutch with high binding ability, which has simple structure, is able to enhance the outward radial force of the lining and to make power transmission smoother, and has lower manufacturing cost and maintenance expense. It is new and can be put into industrial use.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A clutch with high binding ability, comprising a left lateral plate, a right lateral plate, and a plurality of detent components positioned between the left and the right lateral plates, where each detent component is connected with a resilient element for pulling the detent component back to its original location; and characterized in that: a plurality of positioning bars is provided between the left and right lateral plates; each detent component has a detent block, a detent element, and an elastic element, where the detent block is movably positioned between the left and right lateral plates; the detent element is slidably connected to the detent block to be slidable with respect to the detent block in a circumferential direction; one end of the detent element is provided with a groove for locating one positioning bar therein; and the elastic element is provided between the detent block and the detent element.

2. The clutch with high binding ability as claimed in claim 1, wherein a first positioning slot is formed in the detent block for locating one end of the elastic element therein.

3. The clutch with high binding ability as claimed in claim 1, wherein a first positioning slot is formed in the detent block and a second positioning slot is disposed on the detent element respectively for locating two ends of the elastic element.

4. The clutch with high binding ability as claimed in claim 3, wherein the elastic element is a compression spring.

5. The clutch with high binding ability as claimed in claim 1, wherein the groove in each of the detent elements is of a V-shape.

6. The clutch with high binding ability as claimed in claim 5, wherein the grooves of the detent elements are in V-shape at different angles.

7. The clutch with high binding ability as claimed in claim 1, wherein the detent block has a space; the detent element includes a base and a lining connected to the base and is slidably connected into the space of the detent block.

8. The clutch with high binding ability as claimed in claim 7, wherein at least a guide track is provided within the space of the detent block while the base is provided with at least a guide slot thereon corresponding to the guide track.

9. The clutch with high binding ability as claimed in claim 7, wherein a first positioning slot is provided within the space of the detent block for locating one end of the elastic element therein.

10. The clutch with high binding ability as claimed in claim 7, wherein a first positioning slot is provided within the space of the detent block and a second positioning slot is disposed on the detent element for respectively locating two ends of the elastic element.

11. The clutch with high binding ability as claimed in claim 10, wherein the elastic element is a compression spring.

12. The clutch with high binding ability as claimed in claim 7, wherein the groove in each of the detent elements is of a V-shape.

13. The clutch with high binding ability as claimed in claim 12, wherein the grooves of the detent elements are in V-shape at different angles.

* * * * *